Patented May 23, 1933

1,910,338

UNITED STATES PATENT OFFICE

ARTHUR M. HOWALD, OF PITTSBURGH, PENNSYLVANIA, ASSIGNOR TO TOLEDO SYNTHETIC PRODUCTS, INC., OF TOLEDO, OHIO, A CORPORATION OF OHIO

METHOD OF MAKING RESINOUS MATERIALS

No Drawing.    Application filed June 7, 1930. Serial No. 459,822.

This invention relates to resinous materials formed by the condensation of aldehydes with nitrogenous compounds. I have discovered that such materials can be produced from ammonium thiocyanate and an aldehyde such, for example, as formaldehyde.

I have also found that a molding powder can be produced from ammonium thiocyanate and an aldehyde capable of being stored and otherwise handled as a commercial commodity without material deterioration and capable of being molded under heat and pressure to form hard, durable objects which will not soften under heat and which are not subject to rapid deterioration from ageing or weathering.

The invention further comprises a method of making such a molding powder wherein ammonium thiocyanate and formaldehyde are caused to undergo a preliminary reaction in solution, solvent is removed by evaporation to produce a syrupy liquid (at which stage a filler may be added if desired), and the syrupy liquid is dried and the material pulverized to form the molding powder, which subsequently may be molded under heat and pressure.

Ammonium thiocyanate (1 mol.) is caused to react in aqueous solution with formaldehyde (1½–2 mols.). Some free sulphur usually appears as a precipitate and may be left to function as a filler in the final product. The solution is heated to boiling to start the reaction. The heat of the reaction then causes spontaneous boiling and the solution is refluxed until the spontaneous boiling ceases. The reaction may be accelerated by increasing or retarded by reducing the hydrogen ion concentration, which in the initial solution will vary with different lots of raw materials. After refluxing, the solution is concentrated by evaporation until it has been reduced to the condition of a thick syrup. It may then be dried and powdered by various methods.

The proportion of formaldehyde employed during the condensation is greater than is required in the final product, but the use of an excess of formaldehyde during the early stages of the process results in a better final product. I have found, however, that the existence of uncombined formaldehyde in the finished product has undesirable effects, such as reducing the resistance of the molded product to ageing and weathering. I, therefore, fix the uncombined formaldehyde by the addition of a substance which will react with it to form a desirable constituent of the resin. I may, for example, employ thiourea, in the manner in which it is described as employed in my prior application Ser. No. 363,412, to combine with the excess formaldehyde, or I may employ for this purpose resorcinol, the employment of which for the purpose of fixing excess formaldehyde in formaldehyde-urea resins is described in my co-pending application No. 484,718, filed September 26, 1930.

During hardening under heat in the mold, formaldehyde is liberated and it is desirable that the molding powder contain an ingredient capable of fixing the formaldehyde thus liberated to form additional resin. The liberated formaldehyde may be fixed by combination with part of the thiourea, resorcinol or other substance which may be added before drying the condensate, but I have discovered that superior results may be obtained by mixing dry resorcinol or dry urea, thiourea or an equivalent substance with the dried and powdered condensate to fix the residual formaldehyde as it is liberated under heat in the mold. The process for making formaldehyde-urea resins employing this step is described and the process is broadly claimed in my co-pending application No. 481,807, filed September 13, 1930.

For the purpose of improving the quality of the final product I incorporate in it a plasticizer, preferably an unsaturated ester of a polybasic acid with a polyhydric alcohol, that is, an ester containing free acid groups. It is feasible to employ for plasticizing purposes such miscible materials as esters of meta-toluene-sulfon-amid, naphthols, etc., but I prefer the first-mentioned plasticizing agent for the reason that it not only acts as a plasticizing agent but it also makes a hydrogen ion concentration adjustment, whereas when neutral plasticizers are employed the addition of acid is required.

When the addition of acid is required, I prefer to dissolve in the plasticizer an organic acid of a comparatively high molecular weight, such as phthalic acid, tartaric acid, or salicylic acid. Such acids are liberated only upon the application of heat.

Processes including the above mentioned means for fixing excess formaldehyde, plasticizing and adjusting hydrogen ion concentration which are applicable in the manufacture of resins from combinations of other nitrogen derivatives with aldehydes are described and claimed in co-pending applications, this application relating more particularly to products obtained through the condensation of ammonium thiocyanate with an aldehyde and the processes and process steps employed in making such products.

Having described my invention, I claim:

1. The process of making a moldable product comprising condensing ammonium thiocyanate with formaldehyde, adding a plasticizing substance, drying, pulverizing, and adding a substance capable of fixing formaldehyde liberated by heat.

2. The process of making a moldable product comprising condensing ammonium thiocyanate with formaldehyde, adding a plasticizing substance, drying, pulverizing, and adding urea to fix formaldehyde liberated by heat.

3. The process of making a molding powder which comprises condensing ammonium thiocyanate with formaldehyde, adding a plasticizer, drying the condensate, pulverizing, and adding a substance capable of fixing formaldehyde upon its release during a subsequent operation of molding under heat and pressure.

4. The process of making a molding powder which comprises condensing ammonium thiocyanate with formaldehyde, adding a plasticizer, drying the condensate, pulverizing, and adding urea to fix formaldehyde liberated during a subsequent operation of molding under heat and pressure.

5. The process of making a resinous product which comprises condensing ammonium thiocyanate with formaldehyde, adding a plasticizer, drying the condensate, pulverizing, adding a substance capable of fixing formaldehyde liberated by heat, and molding under heat and pressure.

6. The process of making a resinous product which comprises condensing ammonium thiocyanate with formaldehyde, adding a plasticizer, drying the condensate, pulverizing, adding urea to fix formaldehyde liberated by heat, and molding under heat and pressure.

7. In the manufacture of resinous materials, the process which comprises adding ammonium thiocyanate to an aqueous solution of formaldehyde, refluxing the same, evaporating the solution to dryness after spontaneous boiling has ceased, pulverizing the residue, and adding a small amount of a fixing agent for formaldehyde and a plasticizer containing an agent capable of liberating acid upon application of heat.

8. In the manufacture of resinous materials, the process which comprises adding ammonium thiocyanate to an aqueous solution of formaldehyde, refluxing the same, evaporating the solution to dryness after spontaneous boiling has ceased, pulverizing the residue, adding a small amount of a fixing agent for formaldehyde and an unsaturated ester of a polybasic acid with a polyhydric alcohol, and molding the product under heat and pressure.

ARTHUR M. HOWALD.